(12) United States Patent
Kari

(10) Patent No.: US 9,973,023 B2
(45) Date of Patent: May 15, 2018

(54) INDUCTIVE ENERGY TRANSFER COIL STRUCTURE

(71) Applicant: Provenance Asset Group LLC, Essex, CT (US)

(72) Inventor: Juhani Kari, Lieto (FI)

(73) Assignee: Provenance Asset Group LLC, Essex, CT (US)

( * ) Notice: Subject to any disclaimer, the term of this patent is extended or adjusted under 35 U.S.C. 154(b) by 220 days.

(21) Appl. No.: 14/647,394

(22) PCT Filed: Nov. 29, 2012

(86) PCT No.: PCT/FI2012/051183
§ 371 (c)(1),
(2) Date: May 26, 2015

(87) PCT Pub. No.: WO2014/083234
PCT Pub. Date: Jun. 5, 2014

(65) Prior Publication Data
US 2015/0303735 A1  Oct. 22, 2015

(51) Int. Cl.
*H02J 50/00* (2016.01)
*H02J 7/00* (2006.01)
(Continued)

(52) U.S. Cl.
CPC ............ *H02J 7/025* (2013.01); *H01F 27/365* (2013.01); *H01F 38/14* (2013.01); *H02J 5/005* (2013.01);
(Continued)

(58) Field of Classification Search
None
See application file for complete search history.

(56) References Cited

U.S. PATENT DOCUMENTS 6,008,622 A    12/1999  Nakawatase
7,486,048 B2*   2/2009  Tsukamoto .......... A61N 1/3787
                                                    320/112
(Continued)

FOREIGN PATENT DOCUMENTS

CN    102544615 A   7/2012
JP    H11-103531 A  4/1999
(Continued)

OTHER PUBLICATIONS

Office action received for corresponding Japanese Patent Application No. 2015-543488, dated Apr. 27, 2016, 8 pages of office action and 5 pages of office action translation available.
(Continued)

*Primary Examiner* — Leigh Garbowski
(74) *Attorney, Agent, or Firm* — Dinsmore & Shohl LLP

(57) ABSTRACT

The invention relates to wireless energy transfer systems wherein electromagnetic field is used to transfer energy over air. An apparatus of a wireless energy transfer system comprises an inductive energy transfer coil (43) comprising at least two adjacent wire turns, wherein said turns are arranged to be coupled to a battery (41) such that said turns vertically surround the battery (41) during inductive energy transfer. The invention further relates to a method for producing the apparatus and an electronic device comprising the apparatus.

10 Claims, 5 Drawing Sheets

(51) Int. Cl.
*H02J 7/02* (2016.01)
*H02J 50/90* (2016.01)
*H02J 50/12* (2016.01)
*H02J 50/70* (2016.01)
*H01F 38/14* (2006.01)
*H01F 27/36* (2006.01)
*H02J 5/00* (2016.01)
*H02J 50/10* (2016.01)

(52) U.S. Cl.
CPC ............ *H02J 7/0052* (2013.01); *H02J 50/10* (2016.02); *H02J 50/12* (2016.02); *H02J 50/70* (2016.02); *H02J 50/90* (2016.02)

(56) References Cited

U.S. PATENT DOCUMENTS

| | | | | |
|---|---|---|---|---|
| 9,030,159 | B2* | 5/2015 | Chen | A61N 1/3787 320/108 |
| 9,246,352 | B2* | 1/2016 | Park | H02J 7/00 |
| 9,438,066 | B2* | 9/2016 | Suzuki | H01M 10/46 |
| 9,636,508 | B2* | 5/2017 | Chen | A61N 1/3787 |
| 2007/0232371 | A1 | 10/2007 | Soekawa et al. | |
| 2011/0050164 | A1 | 3/2011 | Partovi et al. | |
| 2011/0086256 | A1 | 4/2011 | Julstrom et al. | |
| 2011/0234155 | A1 | 9/2011 | Chen et al. | |
| 2011/0241617 | A1 | 10/2011 | Hoffman et al. | |
| 2012/0052923 | A1 | 3/2012 | Park | |
| 2012/0112552 | A1 | 5/2012 | Baarman et al. | |
| 2012/0170781 | A1 | 7/2012 | Klemenz et al. | |
| 2016/0142110 | A1* | 5/2016 | Park | H02J 7/00 455/573 |

FOREIGN PATENT DOCUMENTS

| | | | |
|---|---|---|---|
| JP | 2006-149685 | A | 6/2006 |
| JP | 2007-124557 | A | 5/2007 |
| JP | 2007-274551 | A | 10/2007 |
| JP | 2009-501000 | A | 1/2009 |
| JP | 2009-504115 | A | 1/2009 |
| JP | 2009-181815 | A | 8/2009 |
| JP | 2011-234496 | A | 11/2011 |
| JP | 2012-199432 | A | 10/2012 |
| JP | 2013-523260 | A | 6/2013 |
| JP | 2013-540411 | A | 10/2013 |
| WO | 2007/013725 | A1 | 2/2007 |
| WO | 2007/080820 | A1 | 7/2007 |
| WO | 2008/050917 | A1 | 5/2008 |
| WO | 2011/031233 | A1 | 3/2011 |
| WO | 2011/046223 | A1 | 4/2011 |
| WO | 2011/119352 | A1 | 9/2011 |
| WO | 2012/040548 | A1 | 3/2012 |

OTHER PUBLICATIONS

Extended European Search Report received for corresponding European Patent Application No. 12889043.1, dated Sep. 13, 2016, 07 pages.

International Search Report and Written Opinion received for corresponding Patent Cooperation Treaty Application No. PCT/FI2012/051183, dated May 8, 2013, 11 pages.

Office action received for corresponding Chinese Patent Application No. 201280077338.6, dated Feb. 4, 2017, 9 pages of office action and no pages of office action translation available.

Jul. 25, 2017—(PH) Examination Report—App 1/2015/501188.

Office action in Chinese Patent Application No. 201280077338.6 dated Jun. 19, 2017.

Substantive Examination Report Stage I in Indonesian Application No. P00201503753 with English translation.

* cited by examiner

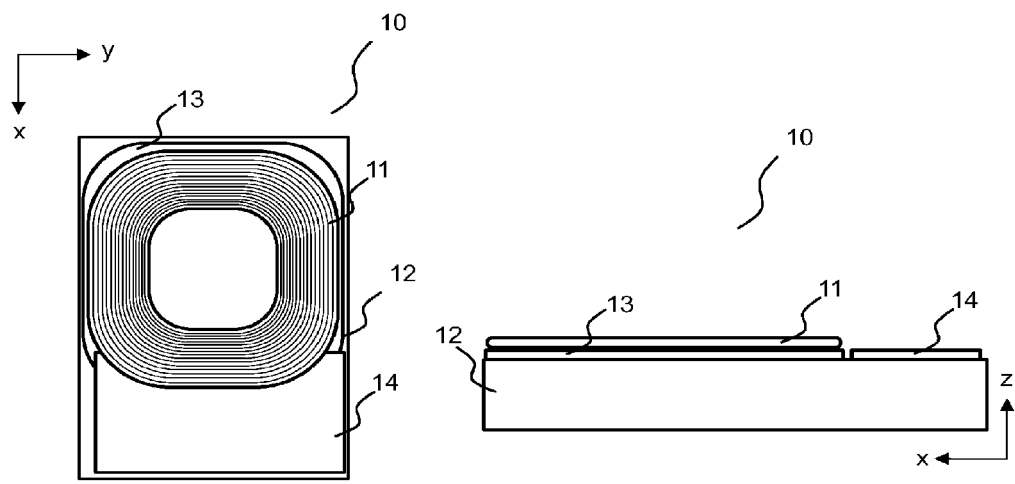
Fig. 1a (Prior Art)
Fig. 1b (Prior Art)
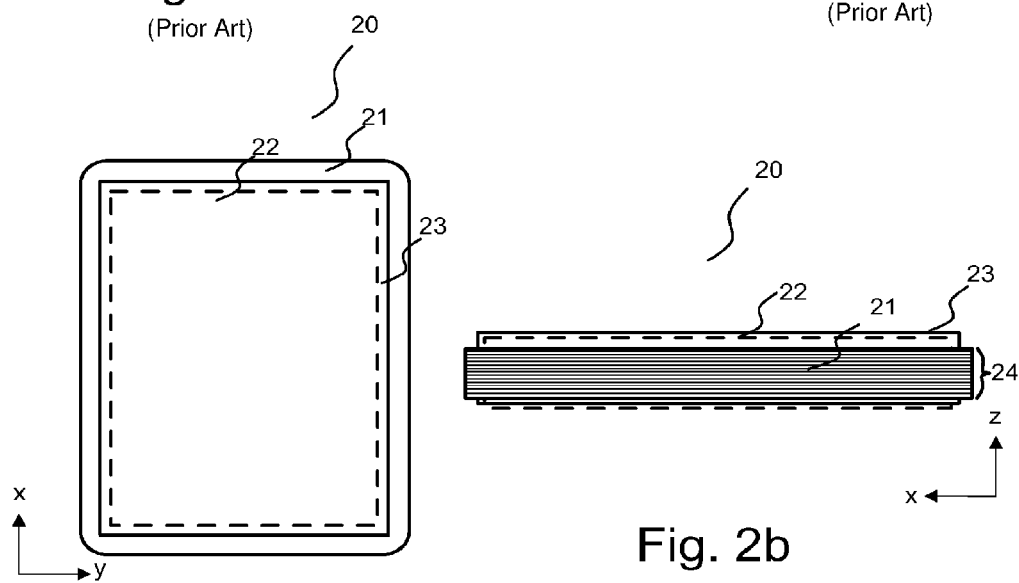
Fig. 2a
Fig. 2b

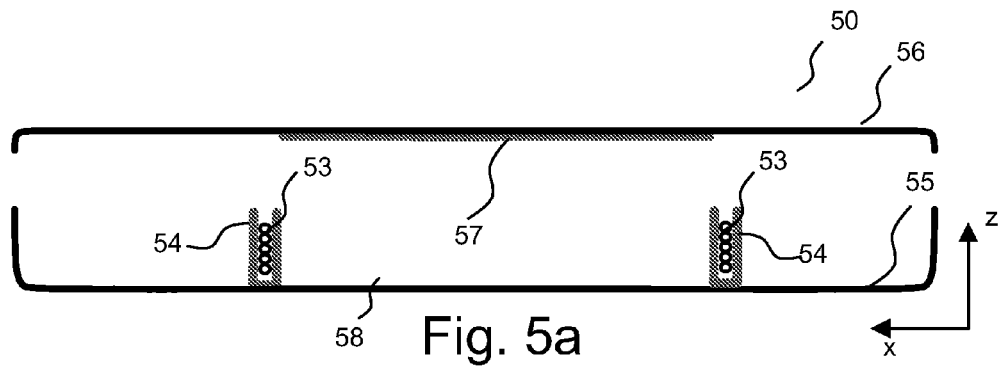
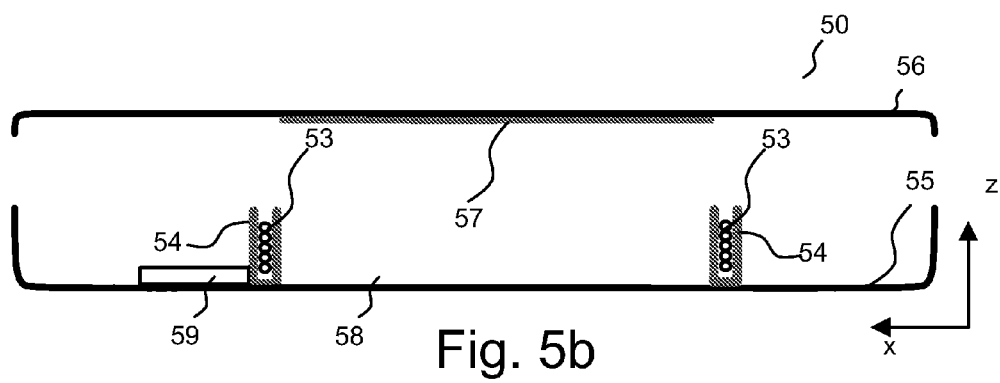
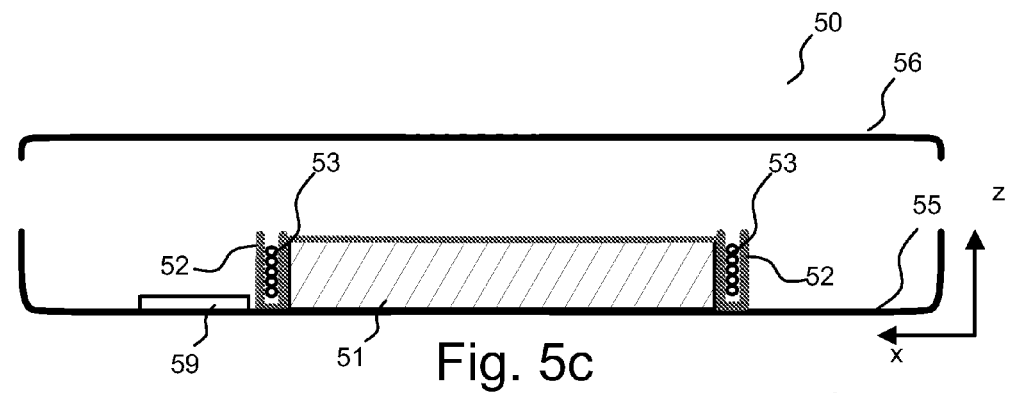
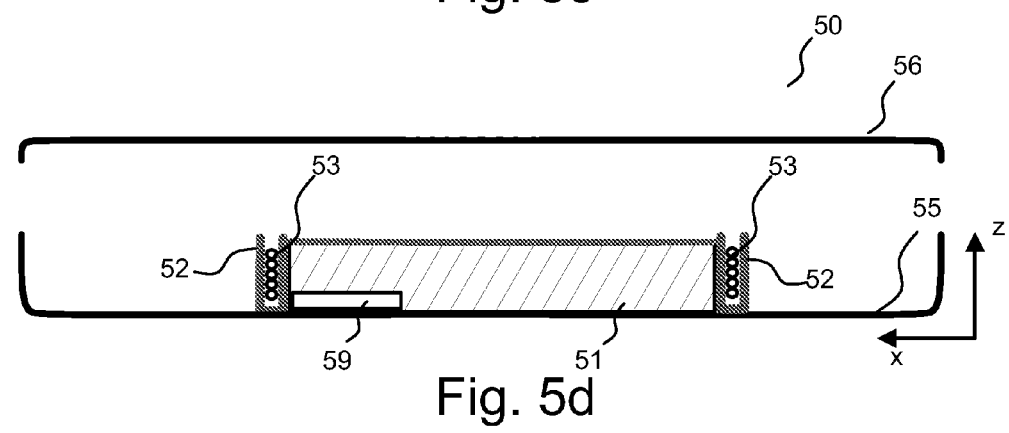

INDUCTIVE ENERGY TRANSFER COIL STRUCTURE

RELATED APPLICATION

This application was originally filed as PCT Application No. PCT/FI2012/051183 filed Nov. 29, 2012.

BACKGROUND

Electromagnetic induction has been known for a long time and it has been used in many applications. In electromagnetic induction a time-varying magnetic flux induces an electromotive force to a closed conductor loop. Vice versa, a time-varying current creates a varying magnetic flux. In transformers, this phenomenon is utilized to transfer energy wirelessly from circuit to another via inductively coupled coils. A primary coil transforms an alternating current into a varying magnetic flux, which is arranged to flow through the secondary coil. The varying magnetic flux then induces an alternating voltage over the secondary coil. The proportion of the input and output voltage can be adjusted by the number of turns in the primary and secondary coils.

Wireless charging is another application where electromagnetic induction is used to transfer energy over air. A wireless charging system comprises a charger device with a primary coil, and a device to be charged with a secondary coil. The current in the charger device is transferred to the charged device through these electromagnetically coupled coils, and the induced current may be further processed and used to charge the battery of the charged device. Energy is transmitted through inductive coupling from the charger device to the charged device, which may use that energy to charge batteries or as direct power.

A trend and key selling point in today's portable electronic devices, e.g. in mobile phones and other smart devices, has been and continues to be the thinness of the device. However, demands of devices suitable for wireless charging are against this trend since those devices need induction coils and induction coils add thickness to device design.

SUMMARY

The present application relates generally to wireless charging systems wherein electromagnetic field is used to transfer energy over air. A wireless charging system may, for example comprise a pair of coils coupled to each other for transferring energy by means of electromagnetic induction. In particular, the invention relates to alignment of the coils in devices to maximize efficiency.

Various aspects of the invention include an apparatus for transferring inductive energy, a device comprising the apparatus for transferring inductive energy and a method for producing the apparatus, which are characterized by what is stated in the independent claims. Various embodiments of the invention are disclosed in the dependent claims.

According to a first aspect of the invention, there is provided an apparatus comprising an inductive energy transfer coil comprising at least two adjacent wire turns, wherein said turns of the inductive energy transfer coil are arranged to be coupled to a battery such that said turns of the inductive energy transfer coil vertically surround the battery during inductive energy transfer.

According to an embodiment, the apparatus further comprises the battery. According to an embodiment, the apparatus further comprises an inductive energy transfer circuitry, wherein said circuitry is integrated to the battery. According to an embodiment, the apparatus further comprises a first ferrite shield, wherein the first shield is arranged to cover the inductive energy transfer coil and the battery so that the inductive energy transfer coil is enabled for inductive energy transmission. According to an embodiment, the apparatus further comprises a first ferrite shield, wherein the first shield is arranged to cover the inductive energy transfer coil such that the first shield at least partially reveals the inductive energy transfer coil for transferring inductive energy. According to an embodiment, the apparatus further comprises a second ferrite shield arranged to cover the battery. According to an embodiment, the second ferrite shield is attached to the battery. According to an embodiment, the inductive energy transfer coil is wound around the battery so that at least part of the first ferrite shield is between the inductive energy transfer coil and the battery. According to an embodiment, the apparatus is a part of an electronic device. According to an embodiment, the second shield is attached to a cover of the device. According to an embodiment, the inductive energy transfer coil is arranged to comprise at least two non-concentric loops, and wherein said at least two non-concentric loops are connected in series. According to an embodiment, the electronic device is a mobile phone.

According to a second aspect of the invention, there is provided an apparatus comprising means for inductive energy transmission, wherein the means for inductive energy transmission comprises an inductive energy transfer coil comprising at least two adjacent wire turns, wherein said turns of the inductive energy transfer coil are arranged to be coupled to a battery such that said turns of the inductive energy transfer coil vertically surround the battery during inductive energy transfer.

According to a third aspect of the invention, there is provided a method comprising: locating an inductive energy transfer coil comprising at least two adjacent wire turns in an inductive energy transfer device; and arranging said turns of the inductive energy transfer coil to be coupled to a battery such that the turns of the inductive energy transfer coil vertically surround the battery during inductive energy transfer.

According to an embodiment, the method further comprises locating the battery inside the inductive energy transfer coil. According to an embodiment, the method further comprises integrating an inductive energy transfer circuitry to the battery. According to an embodiment, the method further comprises locating a first ferrite shield to cover the inductive energy transfer coil and the battery so that the inductive energy transfer coil is enabled for inductive energy transmission.

According to an embodiment, the method further comprises locating a first ferrite shield to cover the inductive energy transfer coil such that the first shield at least partially reveals the inductive energy transfer coil for transferring inductive energy. According to an embodiment, the method further comprises locating a second ferrite shield to cover the battery. According to an embodiment, the second ferrite shield is attached to the battery. According to an embodiment, the inductive energy transfer coil is wound around the battery so that at least part of the first ferrite shield is between the inductive energy transfer coil and the battery.

DESCRIPTION OF THE DRAWINGS

In the following, various embodiments of the invention will be described in more detail with reference to the appended drawings, in which FIG. 1a-b show a planar coil arrangement for wireless charging;

FIG. 2a-b show an inductive energy transfer coil structure according to an example embodiment;

FIG. 5a-d show cross section views of a device comprising an inductive energy transfer coil structure according to an example embodiment;

DESCRIPTION OF EXAMPLE EMBODIMENTS

Figure 3A:
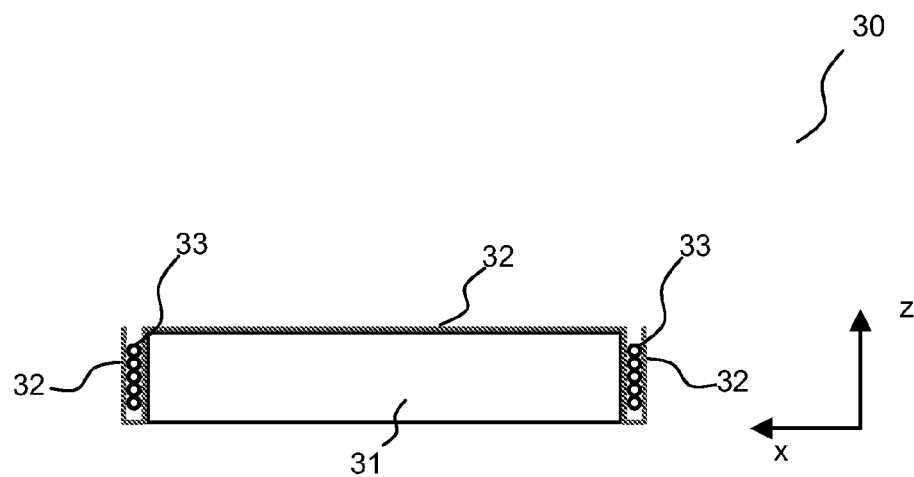
FIG. 3a-c show cross section views of an inductive energy transfer coil structure according to an example embodiment.

In the following, several embodiments of the invention will be described in the context of an apparatus for transferring inductive energy for a device, for example, a mobile device, for wireless charging or wireless energy transmission. It is to be noted, however, that the invention is not limited to mobile devices only. In fact, the different embodiments may have applications widely in any environment where a device needs an inductive energy transfer coil for wireless charging or inductive-based energy transmission. In embodiments of the invention, the inductive energy transfer coil may be used to receive inductive energy from a device or to transmit inductive energy to a device and therefore the inductive energy transfer coil, as described throughout the specification, may be generally referred to as an inductive energy coil.

A device, comprising an apparatus for transferring inductive energy, may be a mobile device, a portable device or any other device suitable to receive energy using/by inductive coupling or magnetic resonance, i.e., an inductive energy link. The device may be, for example, a mobile phone, a mobile computer, a mobile collaboration device, a mobile internet device, a smart phone, a tablet computer, a tablet personal computer (PC), a personal digital assistant, a hand-held game console, a portable media player, a digital still camera (DSC), a digital video camera (DVC or digital camcorder), a pager, or a personal navigation device (PND). The invention may also be implemented in objects suitable to be attached to such devices, e.g., a battery or a device cover.

The term "inductive energy coil" or "inductive energy transfer coil" here refers to a coil i.e. a coil that is used to receive and/or transmit inductive energy wirelessly. Such inductive energy transmission may be realized by regular inductive coupling or by exploiting magnetic resonance.

Usually in devices comprising wireless energy transmission systems using inductive-based energy transfer there is a traditional planar coil arrangement above the battery of the device, i.e., between the battery and the cover of the device. The term "cover" here refers to a battery cover, e.g., a back cover of a device. However, the planar coil arrangements increase thickness of devices and in many cases thickness is an unwanted feature of devices. As an example, planar coil arrangements can increase the total thickness of the device about 1 mm, which may be around 10% of total thickness of the device.

Instead of a traditional planar coil arrangement, the embodiments of the invention use vertically wound transfer coils that may be wound, for example, around a battery of a device. According to the present trend the size (i.e. the diameter) of displays of devices is getting larger and thus there is more space in length and width for vertically wound transfer coils. In embodiments of the invention, a vertically wound transfer coil comprising successive wire turns, for example, around a battery may be referred to as a vertical coil.

When a coil is arranged around the battery, a higher battery capacity can be achieved because the vertical space of a planar coil can be used for the battery and thus the volume of the battery may be increased. Alternatively, the higher battery capacity can be traded to make a thinner battery and a thinner device. The battery capacity is based directly on the volume of the battery (Height*Width*Thickness). For example, in a case, where a device X with a vertical coil arranged around a battery of the device X so that the device X is 1 mm thinner (thickness is 1 mm less) than a device Y with a planar coil arrangement, the battery capacity of the device X may reduce only 3% compared to the battery capacity of the device Y. However, if both devices X and Y have the same thickness, the battery capacity of the device X may increase up to 18% compared to the battery capacity of the device Y.

In addition, it is possible to use a litz coil wire and/or a thicker wire in vertical coils, because thickness, i.e., diameter of the coil wire or diameter of the vertical coil does not affect the thickness of the device. Thickness of the wire may, for example, restrict the number of successive wire turns around the battery, but the use of a thicker coil wire may reduce the coil loss and thus a thicker coil wire may improve charging efficiency. The lizt coil wire is designed to reduce the skin effect and proximity effect losses in conductors used at frequencies up to about 1 MHz. Thus, the litz coil wire may be used to make inductors and transformers, especially for high frequency applications where the skin effect is more pronounced and proximity effect can be an even more severe problem. The lizt coil may consist of many thin wire strands, individually insulated and twisted or woven together, following one of several patterns and often involving several levels (groups of twisted wires are twisted together, etc.). In existing planar coil solutions the target is to minimize the coil thickness and thus to use coil wires that are as thin as possible. A thin coil wire may cause higher coil resistance and hence bigger coil losses. In addition, very thin planar coils may not work or they may limit charging current.

Additionally, when a vertical coil is wound around a battery of a device, the circuitry between the coil and the battery may be shorter, because the distance between the coil and the battery is shorter. Thus, energy may not be lost as much as in longer battery charging circuitry of some planar coil arrangements. The efficiency of a battery charging circuitry of a planar coil arrangement may typically be around 85%.

It should also be noted that vertical coils, when compared to planar coil arrangements, may give more freedom for positioning the device for wireless charging. This results from a larger inner diameter of a vertical coil compared to a planar coil with substantially same outer diameter. This can be seen from FIGS. 1a and 2a, where FIG. 1a shows a planar coil and FIG. 2a shows a vertical coil according to an embodiment. As can be seen, the inner diameter of the planar coil 11 is smaller than the inner diameter of the vertical coil 21.

An example embodiment of the present invention and its potential advantages are understood by referring to FIGS. 1 through 8 of the drawings.

FIGS. 1a-b show a planar coil structure 10 of a device. The planar coil 11 is positioned on the battery 12 and the planar coil 11 comprises a plurality of wire turns that are horizontally wound and arranged to be positioned above the battery 12 so that there are adjacent turns but no successive wire turns in direction z. There may be a shield 13 between the coil 11 and the battery 12 for shielding i.e. protecting metals and components inside an apparatus in wireless power transfer applications. There is also shown a circuitry 14 of the coil 11. FIG. 1a shows a top view of the planar coil structure 10 and FIG. 1b shows a side view of the planar coil structure 10.

FIGS. 2a-b show a vertical coil structure 20 of an inductive energy transfer device. The vertical coil 21 is arranged i.e. wound around a battery 22. The vertical coil 21 comprises a plurality of wire turns that are vertically around the battery 22 so that there is a plurality of successive turns 24 on top of each other in direction z around the battery 22. There may be a shield 23 between the coil 21 and the battery 22 and above the battery 22 for protecting the battery 21 and any other parts of the device from a magnetic field. Material of the shield 23 may be ferrite. In addition, the shield 23 may be larger so that it covers also outer and/or lower sides of the vertical coil 21. An inductive energy transfer circuitry comprising wireless charging transceiver electronics of the coil is not shown. The FIG. 2a shows a top view of the vertical coil structure 20 and the FIG. 2b shows a side view of the vertical coil structure 20.

FIG. 3a shows a cross section view of an inductive energy transfer coil structure 30 according to an example embodiment. The inductive energy transfer coil structure 10 may comprise a battery 31, a ferrite shield 32 and an inductive energy transfer coil 33. The wire of the coil 33 is wound around the battery 31 so that the coil 33 surrounds the battery vertically, i.e., in x-direction. In this embodiment, one part of the ferrite shield 32 is arranged above the battery 31 and the other part around the inductive energy transfer coil 33 so that the inner, outer and lower sides of the coil 33 are covered by the ferrite shield 32. The upper part of the coil 33 is not covered by the ferrite shield 32, because the coil 33 is arranged to receive inductive energy from above. In this embodiment, wire is arranged around the battery 31 as a plurality of turns so that there are turns on top of each other in direction z around the battery 31, but no adjacent wire turns in direction x and y. The number of successive wire turns, i.e. the number of turns on top of each other in direction z, is not restricted. The number may depend, for example, on the diameter of the wire and/or size and thickness of the battery 31.

Figure 3B:
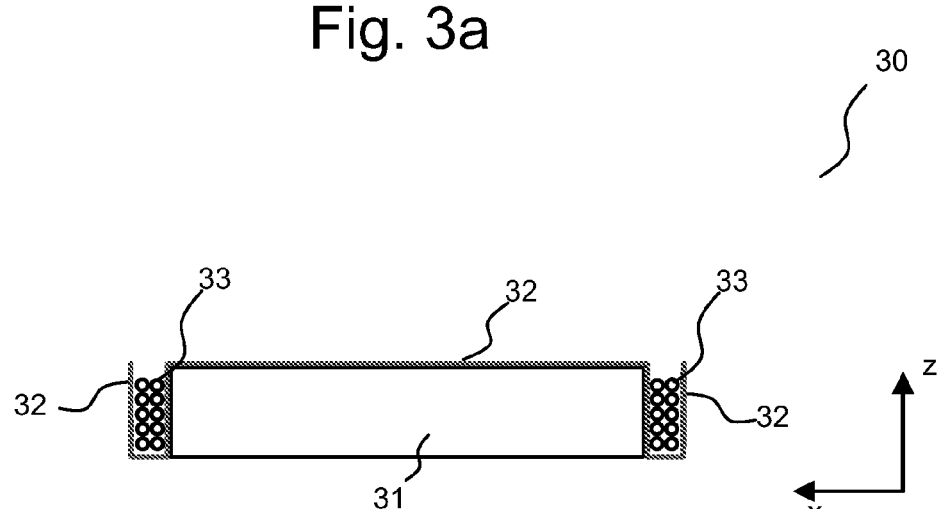

FIG. 3b shows a cross section view of an inductive energy transfer coil structure 30 according to an example embodiment. The inductive energy transfer coil structure 10 may comprise a battery 31, a ferrite shield 32 and an inductive energy transfer coil 33. The wire of the coil 33 is wound around the battery 31 as turns so that the coil 33 surrounds the battery vertically i.e. in x-direction. One part of the ferrite shield 32 is arranged above the battery 31 and the second part around the inductive energy transfer coil 33 so that the inner, outer and lower sides of the coil 33 are covered by the ferrite shield 32. The upper part of the coil 33 is not covered by the ferrite shield 32, because the coil 33 receives inductive energy from above. In this embodiment, turns of the wire are arranged on top of each other in direction z and at least two turns adjacent to each other in direction x. The number of successive or adjacent wire turns is not restricted. The number may depend, for example, on the diameter of the wire, a space for the coil 33, and thickness of the battery 31.

Figure 3C:
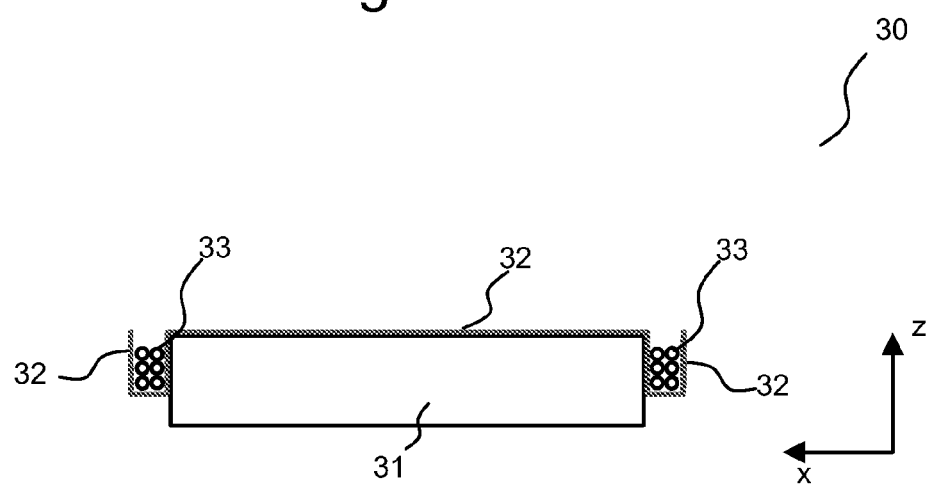

FIG. 3c shows a cross section view of an inductive energy transfer coil structure 30 according to an example embodiment. The inductive energy transfer coil structure 30 may comprise a battery 31, a ferrite shield 32 and an inductive energy transfer coil 33. The wire of the coil 13 is wound around the battery 31 so that the coil 33 surrounds the battery vertically, i.e., in x-direction. The ferrite shield 32 is arranged above the battery 31 and around the inductive energy transfer coil 33 so that at least one of the inner, outer and lower sides of the coil 33 is covered by the ferrite shield 32. The upper part of the coil 33 is not covered by the ferrite shield 32, because the coil 13 is arranged to receive inductive energy from that direction. In this embodiment, the wire is not wound around the lower part (in z-direction) of the battery 11.

Figure 4A:
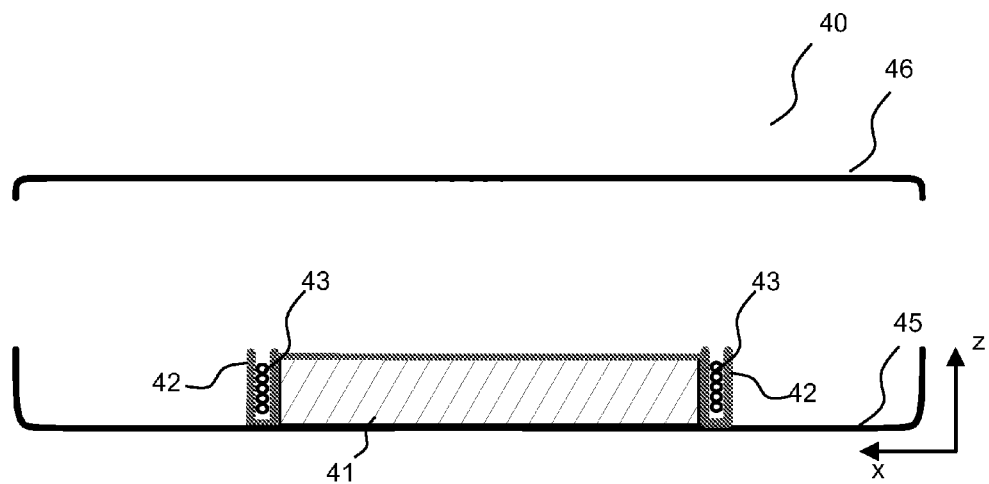
FIG. 4a-c show cross section views of a device comprising an inductive energy transfer coil structure according to an example embodiment.

FIG. 4a shows a cross section view of a device 40 comprising an inductive energy transfer coil structure according to an example embodiment. The device 40 comprises a device casing 45, a battery cover 46 and the inductive energy transfer coil structure. (Other parts of this device are not shown.) The inductive energy transfer coil structure may comprise a battery 41, a ferrite shield 42 and an inductive energy transfer coil 43. The wire of the coil 43 is vertically wound around the battery 41 so that the turns of the coil 43 surround the battery vertically, i.e., in x-direction. The ferrite shield 42 is arranged above the battery 41 and around the inductive energy transfer coil 43 so that the inner, outer and lower sides of the coil 43 are covered by the ferrite shield 42. The upper part of the coil 43 is not covered by the ferrite shield 42, because the coil 43 is arranged to receive inductive energy from that direction. In this embodiment, all the parts of the inductive energy transfer coil structure are attached to the device casing 45.

Figure 4B:
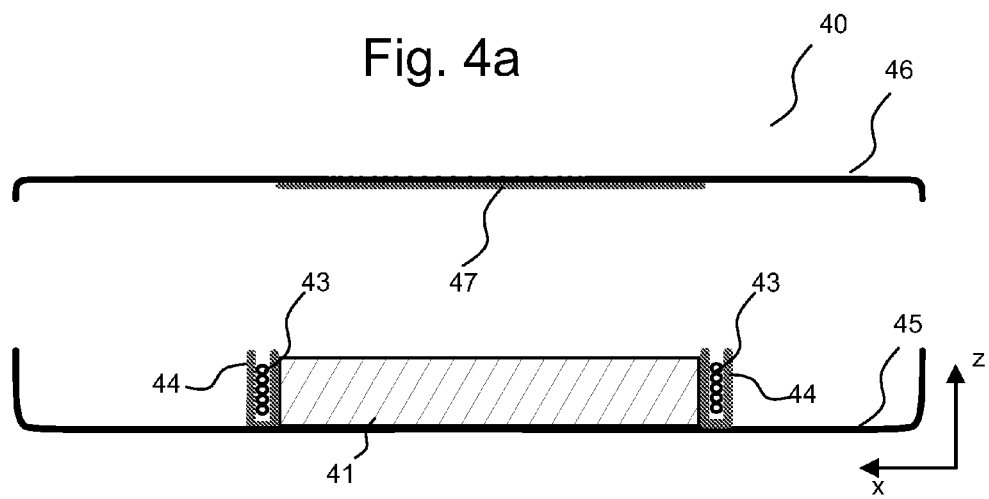

FIG. 4b shows a cross section view of a device 40 comprising an inductive energy transfer coil structure according to an example embodiment. In this embodiment, the ferrite shield is in two parts. These two parts may also be called two different shields. A battery 41, an inductive energy transfer coil 43 and a ferrite shield of the coil 44 are attached onto the device casing 45. The wire of the coil 43 is wound around the battery and the ferrite shield of the coil 44. The ferrite shield of the coil 44 is arranged around the inductive energy transfer coil 43 so that the inner, outer and lower sides of the coil 43 are covered by the ferrite shield 42 and part of the ferrite shield is arranged between the turns of the coil 43 and the battery 41. There is also a second shield, i.e., a ferrite shield of the battery 47. The ferrite shield of the battery 47 is attached to the battery cover 46, inner or outer side of the battery cover 46, so that when the casing 45 and the cover 46 of the device 40 are closed, the ferrite shield of the battery 47 is on the battery 41, thereby protecting the battery 41 and any other parts of the device 40 from a magnetic field.

Figure 4C:
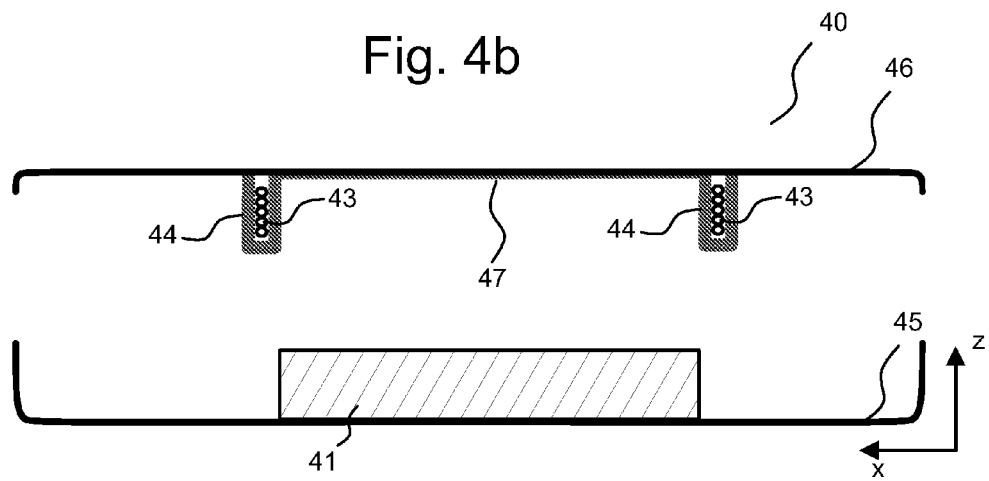

FIG. 4c shows a cross section view of a device 40 comprising an inductive energy transfer coil structure according to an example embodiment. In this embodiment, the ferrite shield may comprise two parts, i.e., two different shields so that these two different shields are connected to each other. The ferrite shield could also be one pieced ferrite shield comprising a part for the coil 43 and a part for the battery 41.

The battery 41 is attached to the device casing 45 and the ferrite shield of the coil 44, the inductive energy transfer coil 43 and the ferrite shield of the battery 47 are attached to the battery cover 46, to the inner surface of the battery cover 46, so that when the casing 45 and the cover 46 of the device 40 are closed, the ferrite shield of the battery 47 is on the battery 41 and the turns of the wire of the coil 43 surround the battery 41. In addition, a part of the ferrite shield of the coil 44 is between the battery 41 and the coil 43.

As can be seen from FIGS. 4a-4c, different parts of a ferrite shield can have different thickness (e.g. 42 in FIGS. 4a and 4c) and different shields can have different thickness (e.g. 44 and 47 in FIG. 4b). Thickness of the shield affects the permeance of the shield. The thicker the shield is, the higher the permeance is. Higher permeance of a shield covering the coil may concentrate magnetic field better to the coil and a shield covering the battery may then have a thinner ferrite shield. If the shield located on top of the battery is thinner, it is easier to design and manufacture thin devices. In an additional embodiment, when a higher permeability ferrite shield is arranged to cover at least one of the inner, outer and lower sides of a vertical coil, the magnetic flux may better concentrate to the coil. This may enable use of a thinner ferrite shield with lower permeance on top of a battery. Also, this may enable a thinner structure for a device.

It should be noted, that the shield of the vertical coil may not be necessary in all vertical coil structures or it may be replaced by some other shielding structure. Additionally, the shield may be arranged so that only one, two or all of the inner, outer and lower sides of the coil are covered by the ferrite shield.

It should be understood that the exemplary coil structures presented above may be modified and combined to create further embodiments of the invention. For example, different combinations of the coil and ferrite structures presented in FIGS. 4a-c may be directly derived based on the disclosure of this document.

FIG. 5a shows a cross section view of a device 50 comprising an inductive energy transfer coil structure according to an example embodiment. The device 50 comprises a device casing 55, a battery (back) cover 56 and the inductive energy transfer coil structure. (Other parts of this device are not shown.) The inductive energy transfer coil structure may comprise an inductive energy transfer coil 53 and a ferrite shield of the coil 54. The wire of the coil 53 is vertically wound around a battery cavity 58 of the device casing 55 so that the turns of the coil 53 surround the battery cavity 58 vertically, i.e., in x-direction. A ferrite shield 57 for a battery is arranged above the battery cavity 58 and attached to the battery cover 46. The ferrite shield of the coil 54 is arranged around the inductive energy transfer coil 53 so that the inner, outer and lower sides of the coil 53 are covered by the ferrite shield 54. The upper part of the coil 53 is not covered by the ferrite shield 54.

FIG. 5b shows a cross section view of a device 50 comprising an inductive energy transfer coil structure according to an example embodiment. The device 50 comprises a device casing 55, a battery (back) cover 56 and the inductive energy transfer coil structure. (Other parts of this device are not shown.) The inductive energy transfer coil structure may comprise an inductive energy transfer coil 53 and a ferrite shield of the coil 54. The wire of the coil 53 is vertically wound around a battery cavity 58 of the device casing 55 so that the turns of the coil 53 surround the battery cavity 58 vertically, i.e., in x-direction. A ferrite shield 57 for a battery is arranged above the battery cavity 58 and attached to the battery cover 46. The ferrite shield of the coil 54 is arranged around the inductive energy transfer coil 53 so that the inner, outer and lower sides of the coil 53 are covered by the ferrite shield 54. The upper part of the coil 53 is not covered by the ferrite shield 54. The device casing 55 comprises also an inductive energy transfer circuitry 59 comprising wireless charging transceiver electronics of the coil 53.

FIG. 5c shows a cross section view of a device 50 comprising an inductive energy transfer coil structure according to an example embodiment. The device 50 comprises a device casing 55, a battery (back) cover 56 and the inductive energy transfer coil structure. (Other parts of this device are not shown.) The inductive energy transfer coil structure may comprise a battery 51, a ferrite shield 52 and an inductive energy transfer coil 53. The battery 51, the ferrite shield 52 and the inductive energy transfer coil 53 may be integrated together. The wire of the coil 53 is vertically wound around the battery 51 of the device casing 55 so that the turns of the coil 53 surround the battery 51 vertically, i.e., in x-direction. The ferrite shield 52 is arranged above the battery 51 and around the inductive energy transfer coil 53 so that the inner, outer and lower sides of the coil 53 are covered by the ferrite shield 52. The upper part of the coil 53 is not covered by the ferrite shield 52. According to an example embodiment, the battery 51, ferrite shield 52, inductive energy transfer coil 53 may comprise a separate device that is removably attachable to the device 50. A circuitry 59 may comprise wireless charging transfer electronics of the coil 53 and it may be located inside the device casing 55 separate from the battery 51.

FIG. 5d shows a cross section view of a device 50 comprising an inductive energy transfer coil structure according to an example embodiment. The device 50 comprises a device casing 55, a battery (back) cover 56 and the inductive energy transfer coil structure. (Other parts of this device are not shown.) The inductive energy transfer coil structure may comprise a battery 51, a ferrite shield 52, an inductive energy transfer coil 53 and an inductive energy transfer circuitry 59. The battery 51, the ferrite shield 52, the inductive energy transfer coil 53 and the circuitry 59 may be integrated together. The wire of the coil 53 is vertically wound around the battery 51 of the device casing 55 so that the turns of the coil 53 surround the battery 51 vertically, i.e., in x-direction. The ferrite shield 52 is arranged above the battery 51 and around the inductive energy transfer coil 53 so that the inner, outer and lower sides of the coil 53 are covered by the ferrite shield 52. The upper part of the coil 53 is not covered by the ferrite shield 52. The circuitry 59 may comprise wireless charging transfer electronics of the coil 53. For example, when wireless charging transfer electronics are integrated in the battery 51 there is no need for a separate wireless charging add-on covers, but only a regular battery can be replaced by a battery with integrated wireless charging transfer structure. According to an example embodiment, battery 51, ferrite shield 52, inductive energy transfer coil 53, and circuitry 59 may comprise a separate device that is removably attachable to the device 50.

According to embodiments of the invention a wireless charging circuitry, such as circuitry 59, may be arranged to charge the battery directly. Alternatively, the device may comprise another charging circuitry, e.g. for wired charging, and the wireless charging circuitry 59 may charge the battery 51 via the other charging circuitry. Feeding the charging power directly to the battery may provide higher efficiency, because losses due to additional regulation stages may be avoided. Charging via the other charging circuitry may provide compatibility with existing charging solutions.

Figure 6:
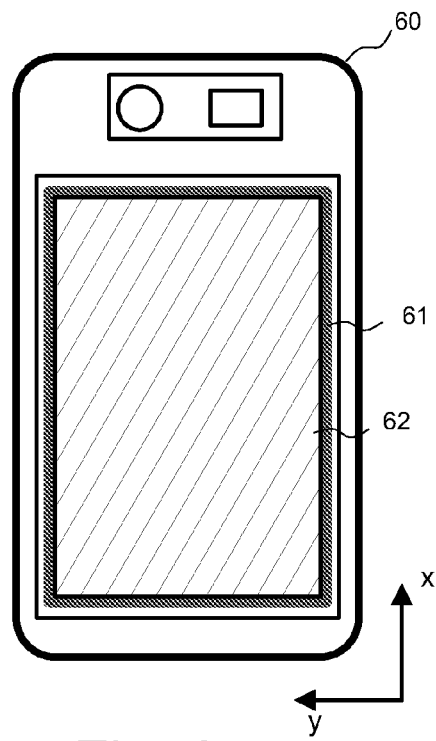
FIG. 6 shows a mobile phone with a vertically wound transfer coil according to an example embodiment.

FIG. 6 shows a mobile phone 60 with a vertically wound inductive energy transfer coil 61 according to an example embodiment in a rear view. The coil 61 is wound around the battery 62 of the mobile phone 60. The mobile phone 60 is shown without the battery cover. A ferrite shield/shields are not shown either.

Figure 7:
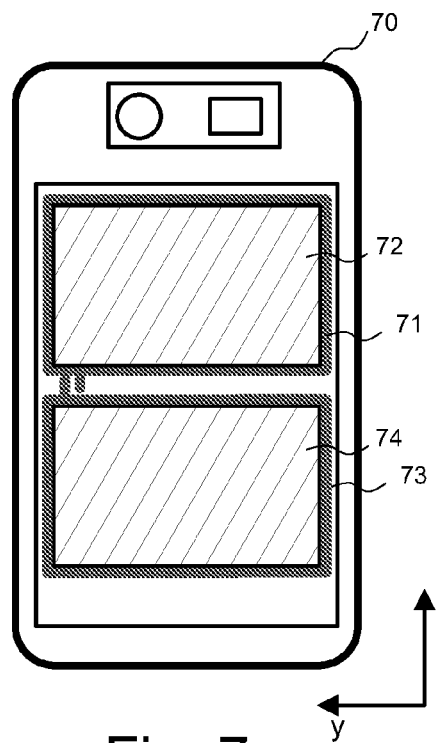
FIG. 7 shows a mobile phone with two vertically wound transfer coils according to an example embodiment.

FIG. 7 shows a mobile phone 70 with a so called multi-loop coil structure comprising a vertically wound inductive energy transfer coil and two batteries according to an example embodiment in a rear view. The coil is divided into two non-concentric parts (loops) 71, 73. The first part (first loop) of the coil 71 is wound around the first battery 72 of the mobile phone 70 and the second part (second loop) of the coil 73 is wound around the second battery 74 of the mobile phone 70. The mobile phone 70 is shown without the battery cover. Ferrite shields are not shown either.

Figure 8:
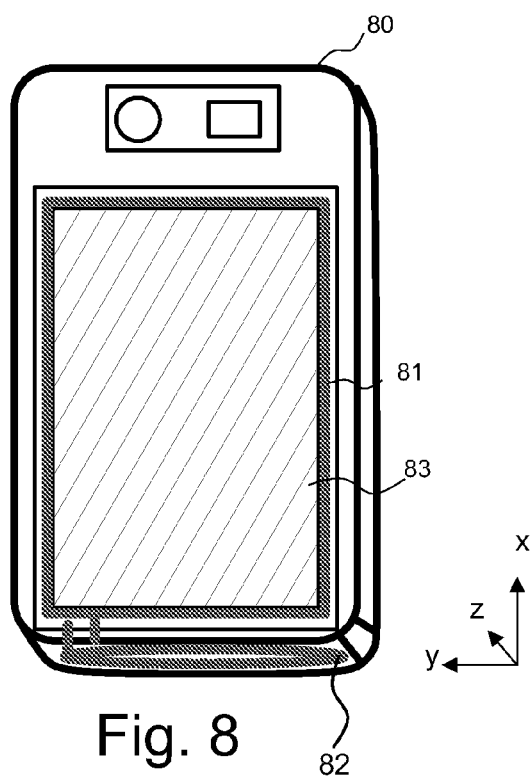
FIG. 8 shows a mobile phone with a vertically wound transfer coil and another additional vertically wound coil according to an example embodiment.

FIG. 8 shows a mobile phone 80 with a so called multi-loop coil structure comprising a vertically wound inductive energy transfer coil and a battery according to an example embodiment in a rear view. The coil is divided into two non-concentric loops 81, 82. The first loop of the coil 81 is vertically wound around the battery 83 of the mobile phone 80 and the second loop of the coil 82 is also vertically wound and arranged to one end of the mobile phone 80. The mobile phone 80 is shown without the battery cover. A ferrite shield/shields are not shown either.

The multi-loop coil structure could be used to serve multiple use cases. In the multi-loop coil structure the wireless charging transfer coil is designed as a multi-loop coil with multiple (more than one) loops of the same or different sizes in series. With this kind of structure the battery of the device may be charged with different locations/sizes of wireless charging transmitter types. It should also be noted that multi-loop transfer coil when compared to one loop transfer coil gives more freedom for positioning the device for wireless charging regardless of a wireless charging transmitter type. In addition, when multiple batteries are used, one coil could surround one or more batteries and thus enable minimum added thickness.

A multi-loop coil structure may also be implemented with planar coil arrangement. In further embodiments, a multi-loop coil structure may be implemented as a combination of vertically wound coil and another type of coil arrangement, e.g., a planar coil. Different loops of the multi-loop coil structure may be assigned for different tasks in the device. For example, one loop of the multi-loop coil structure may be a vertically wound wireless charging transfer coil and another loop may be a planar coil serving for near-field communication (NFC) or any other task.

According to further embodiments of the invention, a device may be able to select one or a plurality of the loops of the multi-loop coil in accordance with different use cases, e.g., by activating or deactivating a mechanical or electrical switch connecting the different loops of the multi-loop. Such arrangement may enable more freedom for the user when placing the phone to perform a task while retaining performance of a single-loop coil structure.

However, it is also possible that there are more than two vertically wound loops of inductive energy transfer coil in a device, for example, 3 or 4 or 5. It is also possible that a loop or loops are vertically wound around some other part of the device than a battery or batteries. Examples of such other parts may include a camera module, a speaker, a microphone, a printed wiring board, shielding can, back of a display, or the like.

Additionally, it is also possible that an inductive energy transfer coil structure is integrated directly to a battery. Thus, this kind of integrated structure can be used to replace an existing normal battery of a device without inductive energy transfer coil and thus achieve a device that is suitable for inductive charging.

It is obvious that the present invention is not limited solely to the above-presented embodiments, but it can be modified within the scope of the appended claims.

The invention claimed is:

1. An apparatus comprising:
  an inductive energy transfer coil comprising at least two adjacent wire turns, wherein the at least two adjacent wire turns of the inductive energy transfer coil are arranged to be coupled to a battery such that the at least two adjacent wire turns of the inductive energy transfer coil vertically surround the battery;
  a first ferrite shield arranged to cover an inner side, an outer side, and a lower side of the at least two adjacent wire turns of the inductive energy transfer coil, wherein at least part of the first ferrite shield covering the inner side of the at least two adjacent wire turns of the inductive energy transfer coil is located between the inductive energy transfer coil and the battery; and
  a second ferrite shield arranged to cover the battery.

2. The apparatus according to claim 1, further comprising an inductive energy transfer circuitry integrated to the battery.

3. The apparatus according to claim 1, wherein the second ferrite shield is attached to the battery.

4. The apparatus according to claim 1, wherein the apparatus is a part of an electronic device.

5. The apparatus according to claim 4, wherein the second ferrite shield is attached to a cover of the electronic device.

6. The apparatus according the claim 4, wherein the electronic device is a mobile phone.

7. The apparatus according to claim 1, wherein the inductive energy transfer coil is arranged to comprise at least two non-concentric loops, and wherein said at least two non-concentric loops are connected in series.

8. A method comprising:
  locating an inductive energy transfer coil comprising at least two adjacent wire turns in an inductive energy transfer device; and
  arranging the at least two adjacent wire turns of the inductive energy transfer coil to be coupled to a battery such that the at least two adjacent wire turns of the inductive energy transfer coil vertically surround the battery;
  arranging a first ferrite shield to cover an inner side, an outer side, and a lower side of the at least two adjacent wire turns of the inductive energy transfer coil, wherein at least part of the first ferrite shield covering the inner side of the at least two adjacent wire turns of the inductive energy transfer coil is located between the inductive energy transfer coil and the battery; and
  arranging a second ferrite shield to cover the battery.

9. The method according to claim 8, further comprising integrating an inductive energy transfer circuitry to the battery.

10. The method according to claim 8, wherein the second ferrite shield is attached to the battery.

* * * * *